Nov. 22, 1955  C. A. PURDY  2,724,562
METHOD OF AND AN APPARATUS FOR WINDING CAPACITORS
Filed Jan. 12, 1953  2 Sheets-Sheet 1
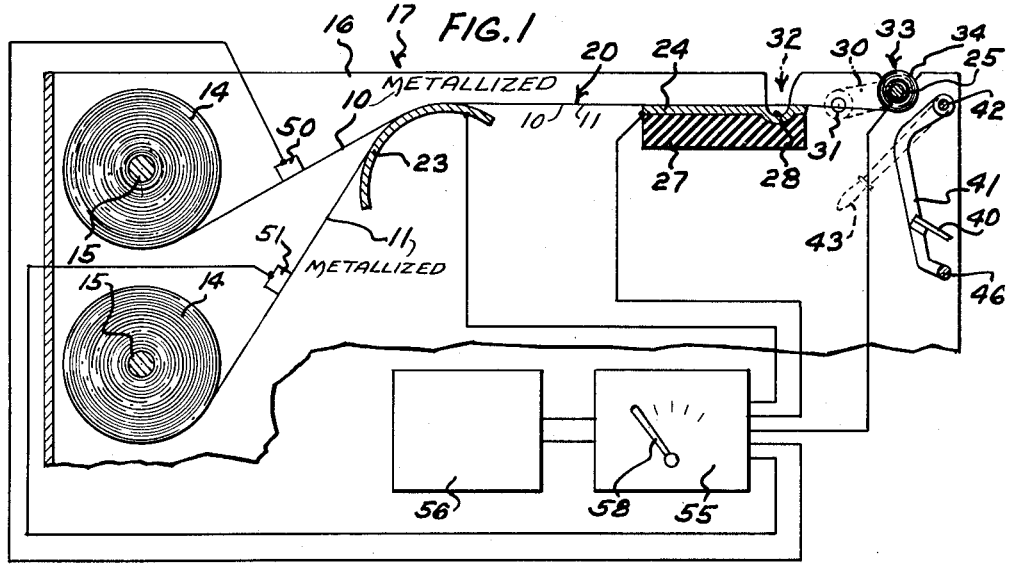
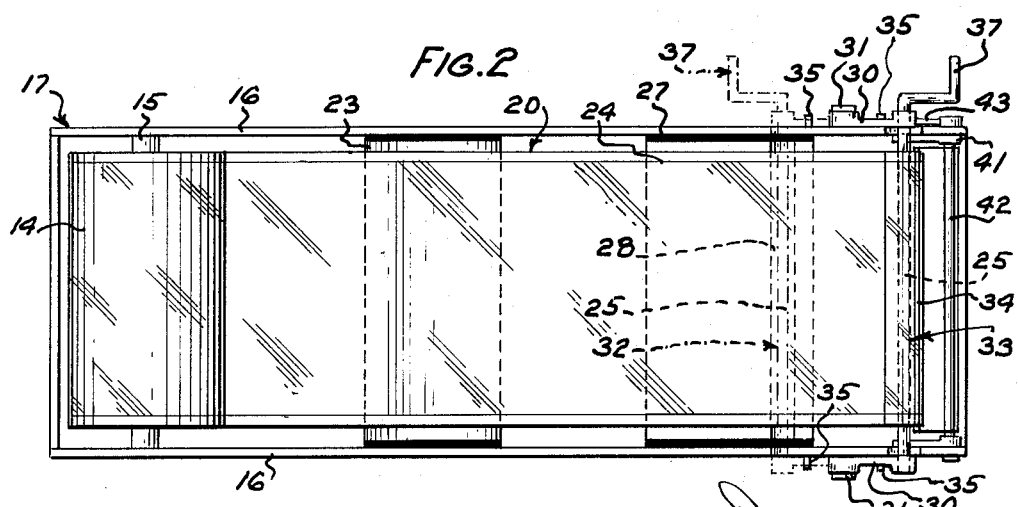
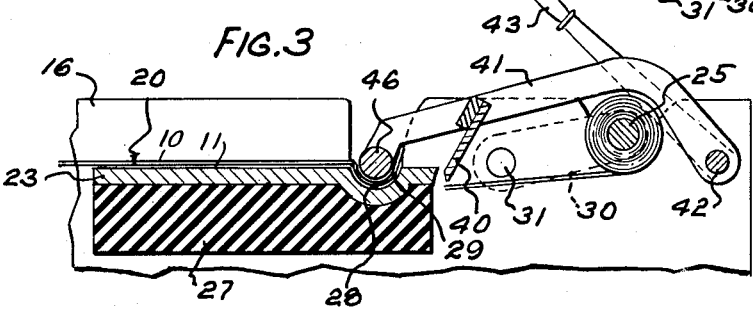
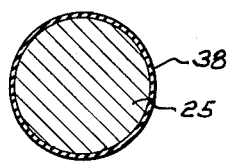
INVENTOR
C. A. PURDY
BY
ATTORNEY Nov. 22, 1955 C. A. PURDY 2,724,562
METHOD OF AND AN APPARATUS FOR WINDING CAPACITORS
Filed Jan. 12, 1953 2 Sheets-Sheet 2
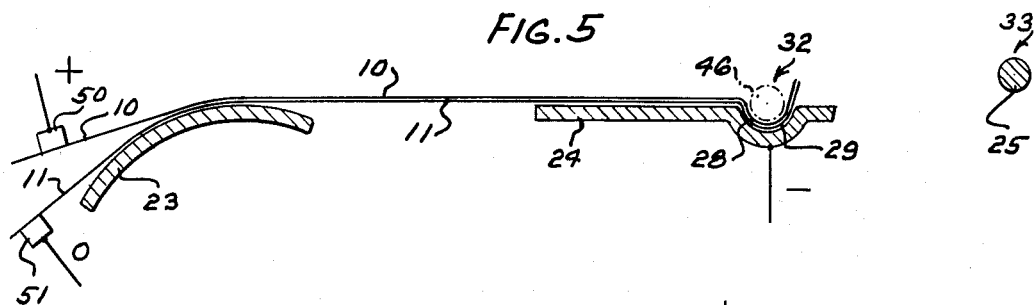
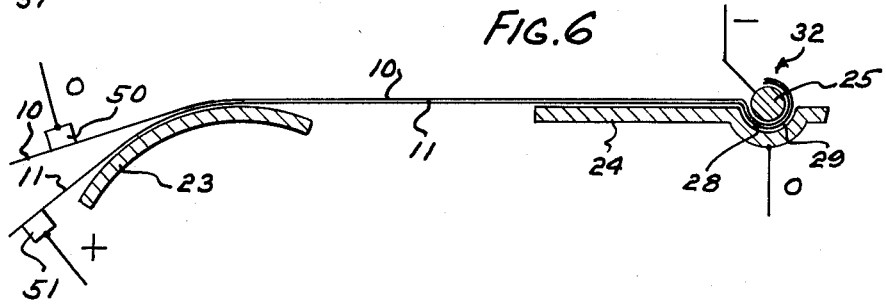
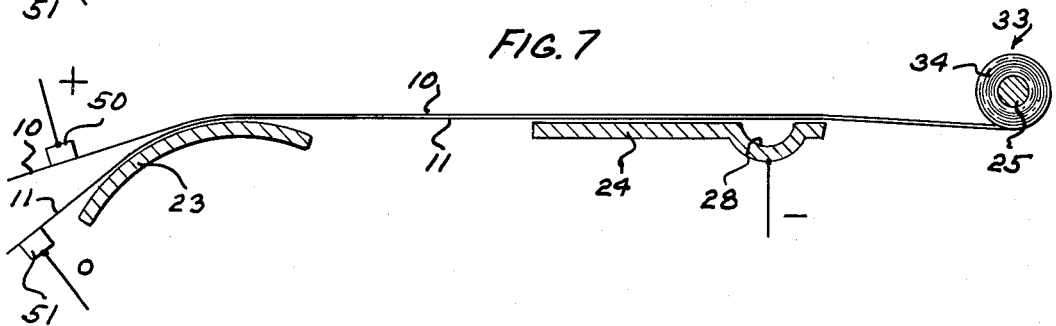
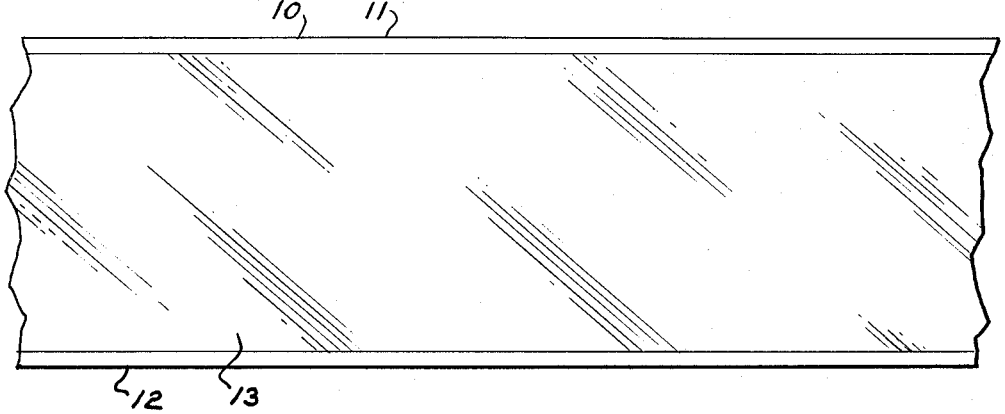
INVENTOR
C. A. PURDY
BY E. F. Kane
ATTORNEY

United States Patent Office 2,724,562
Patented Nov. 22, 1955

2,724,562

METHOD OF AND AN APPARATUS FOR WINDING CAPACITORS

Chester A. Purdy, Hinsdale, Ill., assignor to Western Electric Company, Incorporated, New York, N. Y., a corporation of New York Application January 12, 1953, Serial No. 330,688

16 Claims. (Cl. 242—56)

This invention relates to a method of and an apparatus for winding capacitors from strips of metallized paper and more particularly to a method of and apparatus for electrostatically connecting the ends of strips of metallized dielectric to the arbor of a winding machine and winding capacitors therefrom.

It is an object of the present invention to provide an improved method of and apparatus for winding capacitors from strips of metallized dielectric.

It is a further object of the present invention to provide apparatus for electrically adhering the ends of strips of metallized dielectric to an arbor and winding capacitors therefrom.

In accordance with one embodiment of the invention as applied to the winding of capacitors from a pair of strips of metallized dielectric, each comprising a web of dielectric having a metal stripe thereon, the invention contemplates supporting the strips of metallized dielectric one on the other, placing an arbor on the end portion of the strips, applying potentials of opposite polarities to the arbor and the lower one of the strips to create an electrostatic attraction between the arbor and the lower strip for yieldably holding the ends of the strips onto the arbor, and turning said arbor to wind the strips thereon.

As illustrative of another feature of the invention, the pair of strips of metallized dielectric may be supported on a plate and potentials of opposite polarities applied to the upper strip and the plate to create an electrostatic attraction therebetween for yieldably holding said strips onto the plate after the severance of a wound capacitor therefrom and for applying a tension to the strips during the winding of the strip on the arbor.

Other features of the invention include the provision of mechanism for forming a loop in the end portion of the strip for receiving the arbor therein to facilitate the initial winding of the strip onto the arbor and the provision of switching mechanism for selectively applying potentials of selected polarities to the strips, the arbor, and the metal plate.

Other objects and advantages of the invention will become apparent by reference to the following detailed description and the accompanying drawings illustrating a preferred embodiment thereof, in which Fig. 1 is a diagrammatic vertical longitudinal sectional view of the winding apparatus and the electrical apparatus associated therewith;

Fig. 2 is a plan view of the apparatus;

Fig. 3 is an enlarged vertical longitudinal sectional view of a portion of the apparatus shown in Fig. 1 with some of the parts thereof shown in changed position;

Fig. 4 is an enlarged cross-sectional view through the winding arbor;

Figs. 5, 6, and 7 are diagrammatic views of the apparatus showing different stages of the winding operation; and Fig. 8 is a face view of a metallized strip used in the present machine for winding capacitors.

Referring to the drawings, the capacitors are wound from a pair of strips 10 and 11 of metallized dielectric (Fig. 1), each strip comprising an elongated web 12 (Fig. 8) of paper or other dielectric material on which one or a plurality of stripes 13 of vaporized metal are deposited. The strips 10 and 11 may be wound into rolls 14, a pair of which are adapted to be supported on rods 15, which in turn are removably supported by and between a pair of side frame members 16 of a winding machine 17. As the strips 10 and 11 advance through the winding machine 17 with the metal stripes 13 uppermost, the strips converge into engagement with each other and with the stripe on the upper strip 10 in superposed and vertically aligned relation to the stripe on the lower strip 11. The metallized strips 10 and 11 in effect form a two-layer web 20 which engages and is supported on a curved metal plate 23 and a horizontally disposed holding plate 24 and is adapted to be wound on an arbor 25.

The curved plate 23 extends between the side frame members 16 and is supported thereby in insulated relation thereto and the metal plate 24 is mounted on a member 27 of insulating material which extends between and is secured to the side frames 16 and supports the plate 24 in insulated relation thereto. The plate 24 is provided with a transversely extending groove or recess 28 having a substantially semi-cylindrical forming surface conforming substantially to the periphery of the arbor 25 and into which the end portion of the web 22 is adapted to be pressed to form an open loop 29 therein.

The arbor 25 is in the form of a cylindrical or polygonal rod rotatably supported in apertures in the ends of a pair of arbor supporting arms 30 pivotally connected at 31 to the outer sides of the side frames 16 (Fig. 2). The arms 30 are oscillatable about the pivots 31 to guide the arbor 25 to and from a first position 32 nesting in the loop 29 of the web 20 and in the recess 28 in the holding plate 24 (Figs. 1 and 6) to initiate the winding of the web 20 on the arbor and a second position 33 (Figs. 1 and 7) to complete the winding of the web on the arbor into a capacitor unit 34. The side frames 16 are cut out to provide clearance for the movement of the arbor to and from its first and second positions and suitable stops 35 are provided on the frames for supporting the arms in said positions. The arbor 25 has a crank arm 37 on one end thereof by means of which the arbor may be rotated to wind the capacitor thereon and on completion of the winding of the capacitor thereon, the arbor 25 may be withdrawn axially from the machine and the capacitor thereon. A thin coating 38 of baked enamel or other insulating material is applied to the periphery of the arbor 25 to insulate it from the metal stripe 13 of the upper strip 10.

The wound capacitor 34 is adapted to be severed from the supply web 20 by means of a cutter 40 which is movable against the web adjacent the end of the plate 24 for cooperation therewith to effect the severance of the web. The cutter 40 is fixed at opposite ends to a pair of arms 41 secured to a shaft 42 supported for rocking movement in the side frames 16. A lever 43 is fixed to the shaft 42 for moving the cutter 40 to and from an inoperative position shown in Fig. 1 and an operative position as shown in Fig. 3 for severing the web 20. A forming rod 46 is mounted on the arms 41 in spaced relation to the cutter 40 for engaging the web 20 and pressing it into the groove 28 to form the U-shaped loop 29 therein. The arbor 25 may be used for this purpose if desired. The forming rod 46 and the cutter 40 are mounted in a predetermined relation to each other on the arms 41 so that when the lever 43 is actuated, the cutter 40 first severs the web 20 and then the forming rod engages the web and presses it into the recess 28 in the plate 24 to form the loop 29.

Means are provided for selectively applying a potential of a predetermined polarity to each of the strips 10 and 11, the curved supporting plate 23, the holding plate 24, and the arbor 25, whereby alternate ones of the strips 10 and 11 are charged with one polarity and the plate 24 and the arbor 25 alternately charged with the opposite polarity to establish an electrostatic field and cause the web 20 to be attracted and yieldably held by either the plate 24 or the arbor 25 during portions of each winding cycle. A pair of brushes 50 and 51 are supported on the machine for wiping engagement with the metallized strips 10 and 11, respectively, and the brushes are electrically connected by suitable conductors to a switching device 55, which in turn is supplied with direct current from a power supply 56. The plate 23, the plate 24, and the arbor 25 are likewise connected by conductors to the switching device 55, the conductor to the arbor 25 permitting withdrawal of the arbor from the machine.

The switching device has a handle 58 movable to a plurality of positions for manipulating the switching device 55 to apply and remove potentials of selected polarities to the various members connected thereto. For purposes of description, the switching device 55 may be assumed to be arranged for selectively applying and removing a positive potential to and from the brushes 50 and 51 and a negative potential to and from the curved plate 23, the horizontal plate 24, and the arbor 25.

In the operation of the device, if we assume that the arbor is in the second position 33, as shown in Fig. 1, and that a capacitor 34 has been completely wound thereon, the handle 58 of the switching device 55 is turned to one position to apply a positive potential to the upper strip 10 and apply a negative potential to the holding plate 24 (Fig. 7), after which the lever 43 is actuated to sever the web 20 and depress the end portion of the web 20 into the groove 28 to form a loop 29 therein. The forming rod 46 and the arbor 25 are then returned to their normal position shown in Fig. 1. The electrostatic field created between the strip 10 and the holding plate 24 serves to attract and yieldably hold the strips 10 and 11 onto the holding plate 24 (Fig. 5).

The arbor 25 is then moved to its first position 32 into engagement with the loop 29 of the web 20, after which the handle 58 of the switching device 55 is turned to another position to remove the positive potential from the upper strip 10 and apply it to the lower strip 11 and to remove the negative potential from the holding plate 24 and apply it to the arbor 25 (Fig. 6) to create an electrostatic field between the arbor 25 and the lower strip 11, causing the end portion of the strips 10 and 11 to be attracted to the arbor and yieldably held thereagainst. The arbor may now be rotated in a counterclockwise direction as viewed in Fig. 6 to wind several convolutions of the web 20 onto the arbor 25 to establish a good mechanical winding connection between the arbor and the web. The arbor 25 may then be moved to its second position 34 as shown in Figs. 1 and 7 to provide clearance for winding the remainder of the capacitor 34 thereon.

The handle 58 of the switching device 55 may then be moved to another position to remove the positive potential from the lower strip 11 and apply the positive potential to the upper strip 10 and to remove the negative potential from the arbor 25 and apply the negative potential to the curved plate 23 and the holding plate 24 to create electrostatic fields between the upper strip and the plates 23 and 24, which serve to attract the web 20 to the plates and apply a tension thereto during the winding of the remainder of the capacitor. After a predetermined length of the web 20 has been wound onto the arbor to form the capacitor, the lever 43 is again actuated to sever the capacitor from the web 20 and form a loop at the end portion of the web 20. The arbor is then withdrawn from the machine and the capacitor previously wound thereon, after which the arbor is re-inserted in the arms 30 and the cycle of operation is repeated for the winding of successive capacitors. With the severance of the web 20, as pointed out above, the electrostatic attraction between the upper strip 10 and the holding plate 24 serves to hold the end portion of the web 20 in position preparatory to the movement of the arbor 25 into engagement therewith.

While the preferred embodiment of the invention has been described in connection with the winding of capacitors from a pair of strips of metallized dielectric, the apparatus is equally well adapted for winding single strips of dielectric or metallized dielectric. Where a single strip of dielectric or metallized dielectric is to be wound onto the arbor, a potential of one polarity is applied to the strip and a potential of the opposite polarity is selectively applied to the plates 23 and 24 and the arbor 25 and the strip is wound in the same manner as described above.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of winding capacitors from a pair of strips of metallized dielectric which comprises supporting the strips of metallized dielectric in superposed relation one to the other, placing an arbor on the end portion of said strips, applying potentials of opposite polarity to the arbor and the lower one of said strips to create an electrostatic attraction between the arbor and the lower strip for yieldably holding said strips onto said arbor, and turning said arbor to wind said strips thereon.

2. A method of winding capacitors from strips of metallized dielectric which comprises supporting a pair of the strips of metallized dielectric in superposed relation one to the other for advancing movement, forming a loop in the end portion of said pair of strips, placing an arbor in the loop in said strips, applying potentials of opposite polarity to the arbor and one of said strips forming the outer portion of said loop to create an electrostatic attraction between the arbor and said one strip for yieldably holding said strips onto said arbor, and turning said arbor to wind said strips thereon.

3. A method of winding capacitors from a pair of strips of metallized dielectric which comprises supporting the strips on a metal plate with one strip superposed on the other, applying potentials of opposite polarities to the upper strip and the plate to form an electrostatic field therebetween for yieldably holding the pair of strips onto said plate, engaging the ends of the strips with an arbor and applying potentials of opposite polarities to the arbor and the lower strip to create an electrostatic field therebetween for yieldably holding the pair of strips onto the arbor and removing the potentials from the upper strip and the metal plate, and rotating the arbor to wind the strips thereon.

4. A method of winding capacitors from a pair of strips of metallized dielectric which comprises supporting the strips one on the other on a metal plate, applying a potential of opposite polarities to the upper strip and the plate to form an electrostatic field therebetween for yieldably holding the pair of strips onto said supporting plate, engaging the ends of the strips while on the plate with an arbor and applying potentials of opposite polarities to the arbor and the lower strip to create an electrostatic field therebetween for yieldably holding the pair of strips onto the arbor, removing the potentials from the upper strip and the metal plate, rotating the arbor to wind a plurality of convolutions of the strips thereon to establish a mechanical winding connection between the strips and said arbor, separating the arbor and the metal plate relative to each other to a position in which portions of the strips are supported on said plate, removing the potentials from the arbor and the lower strip and applying potentials of opposite polarities to the upper strip and the plate to create an electrostatic attraction therebetween, and rotating the arbor to finish winding the strips into a capacitor.

5. A method of winding capacitors from strips of metallized dielectric which comprises supporting a pair of the strips one on the other for advancing movement on a plate and with the end portion of the strips in spaced relation to said plate, forming a loop in the end portion of said plate, placing an arbor in the loop of said strips, applying potentials of opposite polarities to the arbor and one of said strips forming the outer portion of said loop to create an electrostatic attraction therebetween for yieldably holding the ends of said strips onto said arbor, rotating said arbor to wind the strips thereon, removing the potentials from said arbor and said one strip after a mechanical winding connection has been established between the arbor and the strips, and applying potentials of opposite polarities to the other strip and said plate to establish an electrostatic attraction therebetween for applying tension to the strip during the remainder of the winding operation.

6. A method of winding capacitors from strips of metallized dielectric which comprises supporting a pair of the strips of metallized dielectric one on the other on a pair of metal plates which are in spaced relation to each other and with the end portion of the strips on one of said plates, applying a potential of opposite polarities to the upper strip and said one plate to form an electrostatic field therebetween for yieldably holding the pair of strips onto said one plate, engaging the ends of the strips with an arbor and applying potentials of opposite polarities to the arbor and the lower strip to form an electrostatic field between the arbor and said one plate for yieldably holding the pair of strips onto the arbor, removing the potentials from the upper strip and the supporting plate, rotating the arbor to wind a plurality of convolutions of the strips thereon to establish a mechanical winding connection between the strips and said arbor, removing the potentials from the arbor and the lower strip, and applying potentials of opposite polarities to the upper strip and the other plate to create an electrostatic attraction therebetween, rotating the arbor to finish winding the strips into a capacitor, and cutting the strips to sever the capacitor therefrom.

7. In an apparatus for winding capacitors from strips of metallized dielectric, the combination of means for supporting a pair of the strips with one superposed on the other, a metal arbor engageable with the ends of said strips, means for applying potentials of opposite polarities to said arbor and the lower one of said strips for creating an electrostatic attraction therebetween for yieldably holding said strips onto said arbor, and means for rotating said arbor.

8. In an apparatus for winding capacitors from strips of metallized dielectric, the combination of means for supporting a pair of the strips with one superposed on the other including a member having a groove therein, means for pressing the end portions of the strips into said groove to form a loop therein, a metal arbor movable into the loop in said strips, means for applying potentials of opposite polarities to said arbor and the lower one of said strips for creating an electrostatic attraction therebetween for yieldably holding said strips onto said arbor, and means for rotating said arbor.

9. In an apparatus for winding capacitors from strips of metallized dielectric, the combination of means for supporting a pair of the strips with one superposed on the other, means for forming a loop in the end portion of the strips, a metal arbor engageable in the loop in said strips, means for applying potentials of opposite polarities to and removing said potentials from said arbor and the lower one of said strips for creating an electrostatic attraction therebetween for yieldably holding said strips onto said arbor, and means for rotating said arbor.

10. In an apparatus for winding capacitors from a pair of strips of metallized dielectric, the combination of means for supporting said strips for advancing movement including a metal plate, a metal arbor, means for rotating said arbor, means for selectively applying and removing a potential of a selected polarity onto each of said strips, said supporting plate and said arbor, whereby a potential of opposite polarities may be applied to the upper strip and the supporting plate to yieldably hold said strips onto said plate and whereby the arbor may be engaged with the end of said strips and potentials of opposite polarities applied to the lower strip and the arbor to yieldably hold the strips onto the arbor to permit the winding of the strips thereon.

11. An apparatus for winding capacitors from a pair of strips of metallized dielectric comprising means for supporting said strips for advancing movement including a metal plate, a metal arbor, means for rotating said arbor, means for cutting said strips to sever a wound capacitor therefrom, means for forming a loop in the end portion of said strips, means for effecting relative movement between the arbor and the loop in said strips to position the arbor within said loop, means for selectively applying and removing a potential of a selected polarity onto each of said strips, said supporting plate and said arbor, whereby a potential of opposite polarities may be applied to the upper strip and the supporting plate to yieldably hold said strips onto said plate after the severance of the capacitor from the strips and whereby the arbor may be engaged with the end of said strips and potentials of opposite polarities applied to the lower strip and the arbor to yieldably hold the strips onto the arbor to permit the winding of the strips thereon.

12. An apparatus for winding capacitors from a pair of strips of metallized dielectric comprising means for supporting said strips one on the other including a plate having a groove therein, means for pressing the end portion of the strips into said groove to form a loop therein, a metal arbor, means for guiding said arbor into the loop in said strips, means for selectively applying and removing a potential of a selected polarity onto each of said strips, said supporting plate, and said arbor, whereby potentials of opposite polarities may be applied to the upper strip and the supporting plate to yieldably hold said strips onto said plate after the severance of the capacitor from the strips and whereby the arbor may be engaged with the end of said strips and potentials of opposite polarities may be applied to the lower strip and the arbor to yieldably hold the strips onto the arbor to permit the winding of the strips thereon, means for rotating said arbor, and means for cutting said strips to sever a wound capacitor therefrom.

13. An apparatus for winding capacitors from a pair of strips of metallized dielectric comprising means for supporting said strips one on the other for advancing movement including a metal plate and a member having a curved forming surface thereon, a metal arbor, means for rotating the arbor, a cutter, means for actuating said cutter for cooperation with said member to sever a wound capacitor from said strips, means cooperating with said curved forming surface to form a loop in the ends of said strips, means for supporting said arbor in a first position in engagement with said loop and a second position spaced therefrom, and means for selectively applying and removing potentials of selected polarities onto each of said strips, said plate, and said arbor, whereby potentials of opposite polarities may be applied to the upper strip and said plate to yieldably hold said strip onto said plate and potentials of opposite polarities may be applied to the lower strip and the arbor to yieldably hold the end portion of the strips onto the arbor to permit the partial winding of the strips thereon and the movement of the arbor with said partially wound strips thereon to said second position whereby the strips being wound on said arbor in said second position are advanced in engagement with said plate and tension is applied thereto by the electrostatic attraction between the plate and the strips.

14. A method of winding a strip of dielectric which comprises placing an arbor on the end portion of said strip, applying potentials of opposite polarities to the arbor and said strip to create an electrostatic attraction therebetween for yieldably holding the strip onto said arbor, and turning said arbor to wind the strip thereon.

15. A method of winding a strip of metallized dielectric which comprises forming a loop in the end portion of said strip, placing an arbor in the loop in said strip, applying potentials of opposite polarities to the arbor and the strip to create an electrostatic attraction therebetween for yieldably holding he strip onto the arbor, and turning the arbor to wind the strip thereon.

16. In an apparatus for winding a strip of metallized dielectric, the combination of means for supporting said strip of metallized dielectric, a rotatable metal arbor engageable with the end of said strip, and means for applying potentials of opposite polarities to said arbor and said strip for creating an electrostatic attraction therebetween for yieldably holding said strip onto said arbor.

References Cited in the file of this patent
UNITED STATES PATENTS

| | | |
|---|---|---|
| 1,222,827 | Webster | Apr. 17, 1917 |
| 1,952,606 | Purdy | Mar. 27, 1934 |
| 2,569,785 | Sporing et al. | Oct. 2, 1951 |